2,504,880

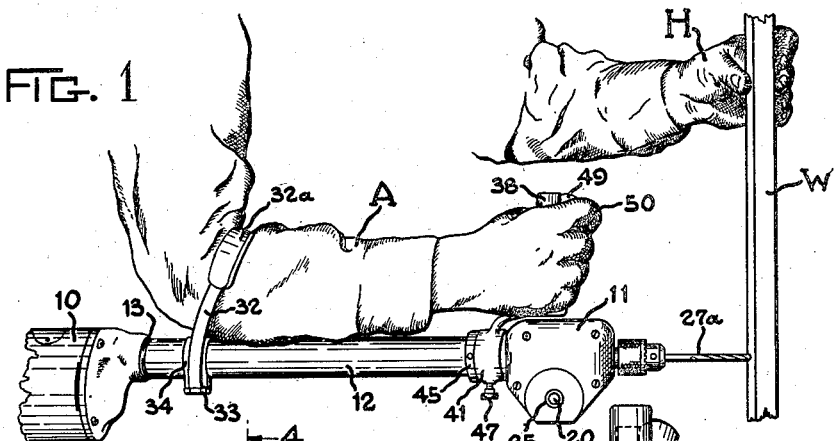
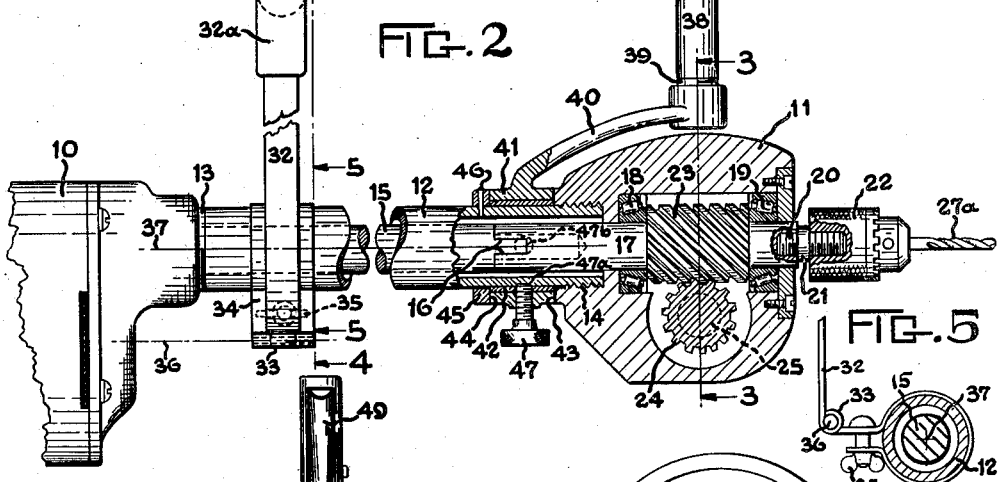
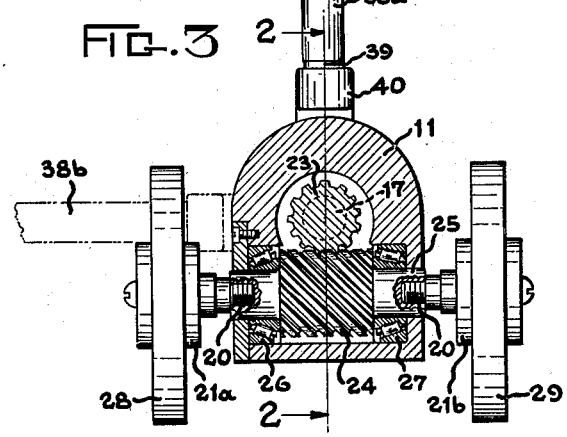
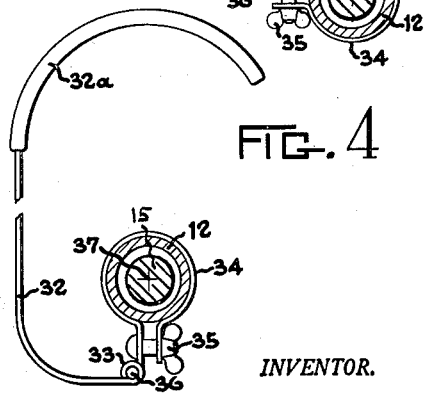
INVENTOR.
CHARLES RITTENHOUSE.
BY
Toulmin + Toulmin
ATTORNEYS April 18, 1950 C. RITTENHOUSE 2,504,880
ARM SUPPORTED UNIVERSAL PORTABLE POWER TOOL
Filed May 23, 1946 2 Sheets-Sheet 2
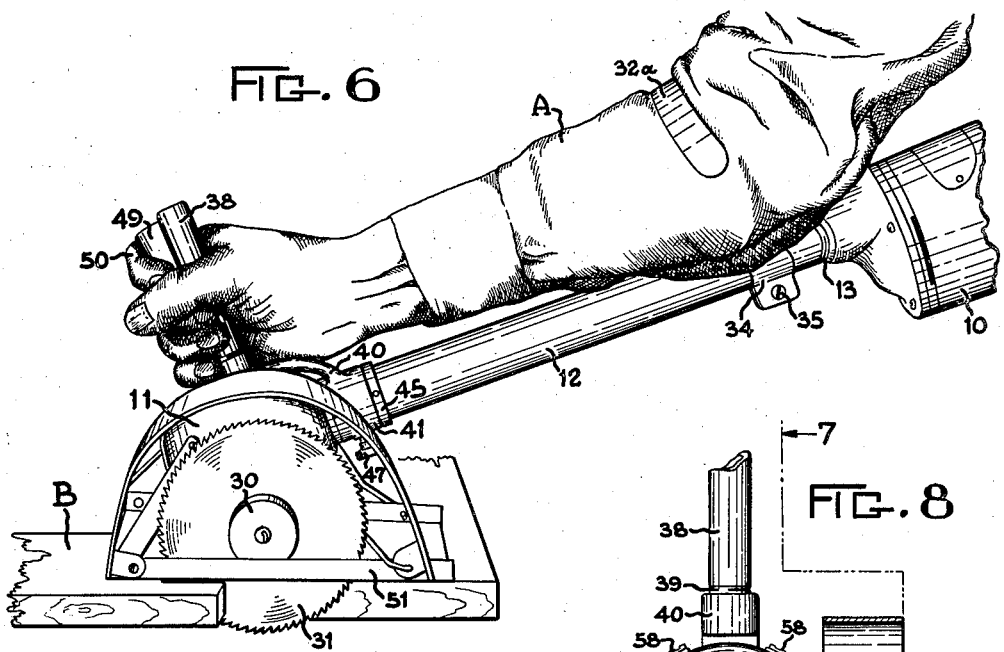
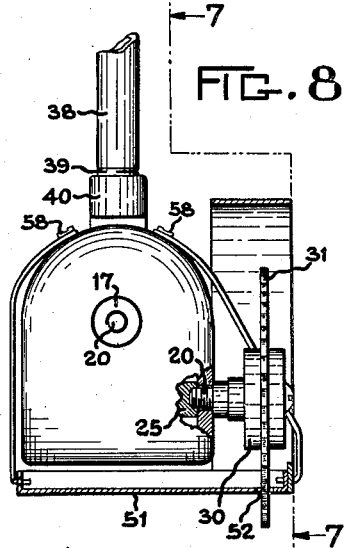
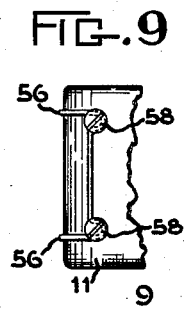
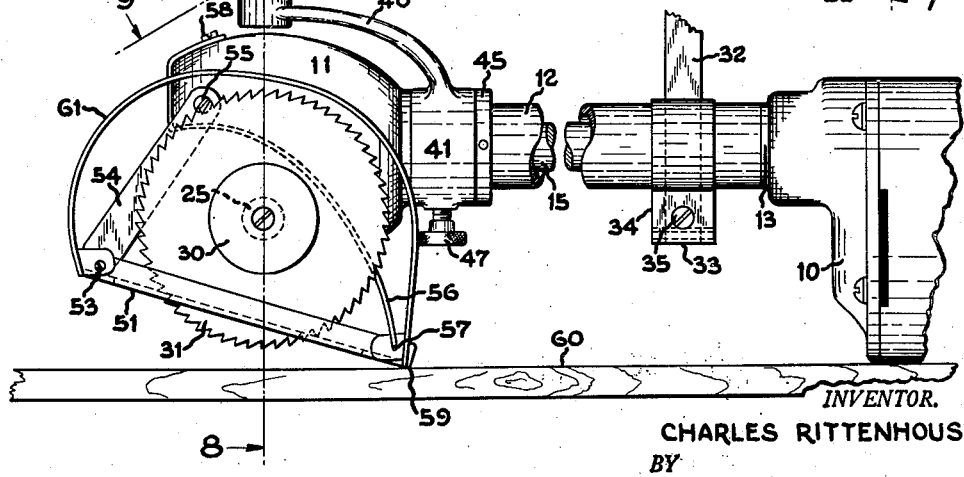
INVENTOR.
CHARLES RITTENHOUSE.
BY
Toulmin & Toulmin
ATTORNEYS Patented Apr. 18, 1950

UNITED STATES PATENT OFFICE 2,504,880

ARM SUPPORTED UNIVERSAL PORTABLE POWER TOOL

Charles Rittenhouse, Cincinnati, Ohio

Application May 23, 1946, Serial No. 671,795

5 Claims. (Cl. 143—43)

This invention pertains to portable power driven tools and is particularly related to a universal portable electric tool adapted to perform a large variety of different types of operations such as drilling, grinding, sanding, buffing, brushing, or sawing.

One of the objects of this invention is to provide a portable power driven tool which may be carried and manipulated by the operator with great ease and accuracy of control.

Another object of this invention is to provide a power driven portable tool which may be readily adapted to performing a series of different types of machining operations.

Still another object of this invention is to provide a portable electric tool which may be carried on the forearm and manipulated by the hand in a perfectly balanced, easily controllable manner to perform a wide variety of different types of operations.

It is also the object of this invention to provide a portable power driven tool having a plurality of tool spindles adapted to mount various different types of drilling, cutting, grinding, sawing, and the like tools, so as to be universally adaptable to performing a large variety of work with a single power driven tool.

Another object is to provide a power driven tool carried on the forearm of the operator in such a way that it may be rotated in a vertical plane while maintaining efficient manual control at all times of the power tool to facilitate the performance of such operations as sanding and the like.

And a further object of this invention is to provide a portable electric tool which may be carried upon and manipulated by the arm of the operator having a tool carrying head with a plurality of tool spindles to readily adapt the tool to accomplishing a large variety of different types of machining operations.

And still another object is to provide in a portable power driven tool having a plurality of tool spindles, a handle arrangement associated with the spindles which may be positioned to facilitate a more adequate application of tools placed on any of the various tool spindles.

And it is a further object to provide an improved saw control arrangement in conjunction with the above power operated tool which automatically releases the saw from contact with the work or table top upon the completion of the sawing operation and the release of the tool by the operator.

Further features and advantages of this invention will appear from a detailed description of the drawings in which:

Figure 1 is a view showing the portable power tool being operated to perform a drilling operation on a work piece.

Figure 2 is an enlarged fragmentary longitudinal section on the line 2—2 of Figure 3, through the tool spindle housing of the power tool.

Figure 3 is a transverse section on the line 3—3 of Figure 2.

Figure 4 is a fragmentary transverse section on the line 4—4 of Figure 2.

Figure 5 is a fragmentary transverse section on the line 5—5 of Figure 2.

Figure 6 shows the tool in use performing a sawing operation.

Figure 7 is a fragmentary side view of the tool arranged for sawing, indicated by the line 7—7 in Figure 8.

Figure 8 is a fragmentary view, partly in section on the line 8—8 of Figure 7.

Figure 9 is a fragmentary view indicated by the line 9—9 of Figure 7.

The portable power driven tool incorporating the features of this invention comprises a driving motor 10 and a tool spindle housing 11 interconnected by an elongated torque tube 12. The drive motor 10 may be of any conventional fractional horsepower type and may be connected to the torque tube 12 by a suitable threaded connection 13. The tool spindle housing or member 11 may be similarly connected to the torque tube 12 by a suitable threaded connection 14. The driving motor 10 has an elongated drive shaft 15 extending through the torque tube 12 and connected by a suitable keyed driving connection 16 with the tool spindle 17. The spindle 17 is journaled on antifriction bearings 18 and 19 in the tool spindle housing 11 and is provided with a threaded connection 20 to which may be attached various tool holder mandrels such as the mandrel 21 which is adapted to carry various tool holder chucks such as the drill chuck 22, Figure 2.

Formed on the spindle 17 is a spiral gear 23 which is in driving engagement with a mating spiral gear 24 formed on a tool spindle 25. The spindle is journaled on suitable antifriction bearings 26 and 27 in the tool spindle housing 11 perpendicular to the spindle 17 and projecting outwardly each side of the housing 11. On each end of the shaft 25 there is provided the same threaded connections 20, as in the case of the spindle 17, to which may be connected various mandrels, such as the mandrel 21a for mounting a sanding disc 28 and a mandrel 21b for mounting a grinding wheel 29. Thus, from the same tool spindle housing 11 there are provided three threaded connections for application of various types of cutting tools. Any variety of different types of tools may be similarly applied to the various spindle outlets 20, as for example the mandrel 30 for mounting the circular saw 31, as best seen in Figures 6, 7, and 8.

A novel arrangement is provided for carrying and manipulating the tool with great ease and nicety of control comprising an arm hook 32 having a suitable curved arm pad 32a which is placed over the forearm A adjacent the elbow, as best seen in Figures 1 and 6. This arm hook 32 has a hinged connection at 33 with an adjustable clamp 34 which may be clamped to the torque tube 12 by means of a suitable thumb screw 35, Figures 4 and 5. The clamp 34 is adjusted longitudinally on the torque tube 12 and clamped by the thumb screw 35 so that the weight of the motor 10 substantially balances the weight of the tool spindle housing 11 in order that the tool spindle housing may be maneuvered with great ease and nicety of control by the operator.

In order to facilitate the manipulation and direction of the tool spindle housing 11 and its respective tools, such as the drill 22a to proper position on a work piece W, there is provided a vertically disposed control handle 38 preferably positioned directly above the tool spindle housing 11. The handle 38 is fixed by a suitable threaded connection 39 to a rocking lever arm 40 having a hub portion 41 journaled at 42 on the torque tube 12 and confined axially on this torque tube by abutting against the surface 43 of the housing 11 and the surface 44 of a collar 45 attached to the torque tube 12 by a pin 46. Thus, the handle 38 may be swung around the torque tube axis 37 from a position 38a, Figure 3, to a position 38b. The handle may be locked in either of these positions 38a or 38b by means of the knurled thumb screw 47, carried in the hub portion 41 of the handle, which may be engaged in detents 47a or 47b, respectively. An electrical control switch 48, actuated by the finger grip lever 49, may be operated by the operator's index finger 50 to control the stopping and starting of the drive motor 10.

When it is desirable to utilize the tool, for example, to perform drilling operations as in Figure 1, the control handle 38 is positioned with the knurled screw 47 in the detent 47a, as shown in Figures 2 and 3. When, however, it is desired to do sanding operations by placing a sanding disc on the spindle 25 in place of the grinding wheel 29 and removing the sanding disc 28 and mandrel 21a from the other end of the spindle 25, it is preferable to rotate the handle 38 to the position 38b, locking it in this position by engagement of the knurled screw 47 with the detent 47b. This places the control handle 38 in a position perpendicular to the sanding disc for the proper application of the disc to the work surface to be sanded. In other words, during sanding operations or when it is desired to use some other tool in the spindle 25 in which force is best applied parallel to the axis of the spindle 25, the control lever 38 may be readily positioned at 38b so that it will be substantially parallel with the tool spindle 25.

It should be noted that the hinged connection 33 for the arm hook lies substantially on the center of gravity 36 of rotary balance of the motor 10, torque tube 12, and spindle housing 11 relative to the axis 37 of the torque tube. As a result, when rotating the control handle 38 to the position 38b, the arm hook 32 likewise swings on the hinge 33 to the position shown in Figure 5. The hinge 33, being substantially on the center of gravity 36, will maintain the tool in proper balanced condition around the axis 37 of the torque tube so that there will be no tendency for the tool to swing around the arm of the operator. Thus, a fully balanced condition is maintained in the tool when using any of the tool spindles while at the same time allowing the proper positioning of the control handle 38 and the arm hook 32 for effecting different types of operations with various types of tools mounted on the various tool spindles. It should be further noted that by this arrangement of carrying the weight of the tool on the forearm A in balanced condition by means of the arm hook 32 and by providing the control handle 38 for manipulating and controlling the position of the tool being applied to the work W, the operator's other hand H is free to manipulate and hold the work W and otherwise steady the operation, a condition not obtainable with more conventional types of portable power tools.

In Figure 6 the power tool is shown arranged for sawing with a saw 31 mounted on the mandrel 30 on the spindle 25. A saw plate 51 is associated with the saw 31 having a slot 52 through which the saw projects. The front portion of the saw plate 51 is pivotally mounted at 53, Figure 7, to a link 54 pivotally connected at 55 to the tool spindle housing 11. To the rear portion of the saw plate is connected a spring 56 by a suitable pivotal connection 57 and the opposite end of the spring is looped around a pair of screws 58, Figure 9, or in any similar fashion secured rigidly to the housing 11. The spring 56 normally urges the rear end portion 59 of the saw plate 51 radially outwardly of the saw so that when the power tool is released by the operator, as shown in Figure 7, the spring 56 will have sufficient pressure to push the end 59 down against the top of the work table or board surface 60 and automatically raise the housing 11 and saw 31 up away from the board 60 to prevent its marring or contacting the table while the motor 10 is still operating. When it is desired to saw, the operator merely presses down on the front portion of the power tool through the handle 38, as shown in Figure 6, and feeds the saw and plate along the board B to be cut. A suitable guard 61 is attached at 53 and 57 to the saw plate to protect the operator from the saw at all times.

Thus, in this sawing arrangement, there is provided a saw plate of yielding construction which automatically raises the saw from the work when the control handle 38 of the power tool is released. In this way, the operator may allow the motor 10 to continuously operate so that it need not be shut off each time a board or piece has been cut and also allows the tool to be maintained in its normal upright sawing position ready for immediate grasp by the operator's arm A to start the sawing operation.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appended claims are intended to be included herein.

Having thus fully set forth and described this invention, what is claimed as new and desired to be secured by United States Letters Patent is:

1. In a portable power tool, a drive motor, a tool spindle member, a torque tube interconnecting said motor and tool spindle member, a power connection from said motor to drive cutting tools mounted on said member, an open end arm hook pivoted adjacent to said motor permitting entry of an arm between said hook and torque tube for carrying said power tool on the arm of the operator, and a control handle associated with said tool spindle member to facilitate the manipulation of said tool by the hand of the arm on which the tool is supported.

2. In a power tool, a drive motor, a tool spindle housing, a torque tube interconnecting said motor and housing, a tool spindle in said housing and means for driving said tool spindle from said motor, an open ended rigid arm hook connected to suspend said motor, torque tube, and housing in balanced condition below the operator's arm, and a control means manipulatable by the operator's hand of said arm associated with said tool spindle housing for directing a cutting tool in said spindle to a work piece to be cut.

3. In a portable electric tool, an electric driving motor, a tool spindle housing, an elongated torque tube, a first tool spindle journaled in said housing, a drive shaft extending through said torque tube from said drive motor to drive said first tool spindle, a second tool spindle journaled in said housing substantially perpendicular to said first mentioned spindle, interchangeable tool support means on the outer end of said first tool spindle and on each end of said second mentioned tool spindle whereby a plurality of different types of cutting tools may be applied to any of said tool spindle mounting means, an open ended rigid arm hook associated with said torque tube and adjustable relative thereto in response to the particular work spindle put in operation to facilitate the manipulation of said tool while maintaining its balance under any operating condition and a control handle associated with said tool spindle housing to permit manipulation of said tool with one hand.

4. In a portable electrical tool, a driving motor, a tool spindle housing, an elongated torque tube, a tool spindle journaled in said housing in coaxial alignment with said torque tube, a drive shaft in said torque tube interconnecting power from said motor to said spindle, a second spindle mounted normal to said first mentioned spindle journaled in said housing and projecting each side thereof, interconnecting driving gearing from said first mentioned spindle to said second mentioned spindle, tool mounting means on each end of said second mentioned spindle and on the outer end of said first mentioned spindle, an open ended rigid arm hook hinged for swinging in a perpendicular plane to the axis of said torque tube and adjustable longitudinally on said tube to obtain a completely balanced suspension of said electric tool on the operator's arm, and control handle means associated with said tool spindle housing to direct cutting tools mounted in said work spindles.

5. In a portable electrical tool, a driving motor, a tool spindle housing, an elongated torque tube, a tool spindle journaled in said housing in coaxial alignment with said torque tube, a drive shaft in said torque tube interconnecting power from said motor to said spindle, a second spindle mounted normal to said first mentioned spindle journaled in said housing and projecting each side thereof, interconnecting driving gearing from said first mentioned spindle to said second mentioned spindle, tool mounting means on each end of said second mentioned spindle and on the outer end of said first mentioned spindle, an open ended rigid arm hook hinged for swinging in a perpendicular plane to the axis of said torque tube and adjustable longitudinally on said tube to obtain a completely balanced suspension of said electric tool on the operator's arm, control handle means associated with said tool spindle housing to direct cutting tools mounted in said tool spindles by the hand of the arm on which said tool is supported, and means for swingably adjusting said handle in a plane perpendicular to the axis of said torque tube in accordance with the tool spindle selected to be used.

CHARLES RITTENHOUSE.

REFERENCES CITED

The following references are of record in the file of this patent:

UNITED STATES PATENTS

| Number | Name | Date |
| --- | --- | --- |
| 712,843 | Paul | Nov. 4, 1902 |
| 733,744 | Raettig | July 14, 1903 |
| 1,303,011 | Aurand | May 6, 1919 |
| 1,751,174 | Richards et al. | Mar. 18, 1930 |
| 1,780,174 | Crowe | Nov. 4, 1930 |
| 2,301,264 | Emery | Nov. 10, 1942 |

FOREIGN PATENTS

| Number | Country | Date |
| --- | --- | --- |
| 403,973 | Germany | Oct. 9, 1924 |
| 785,882 | France | May 27, 1935 |